Patented Nov. 7, 1939

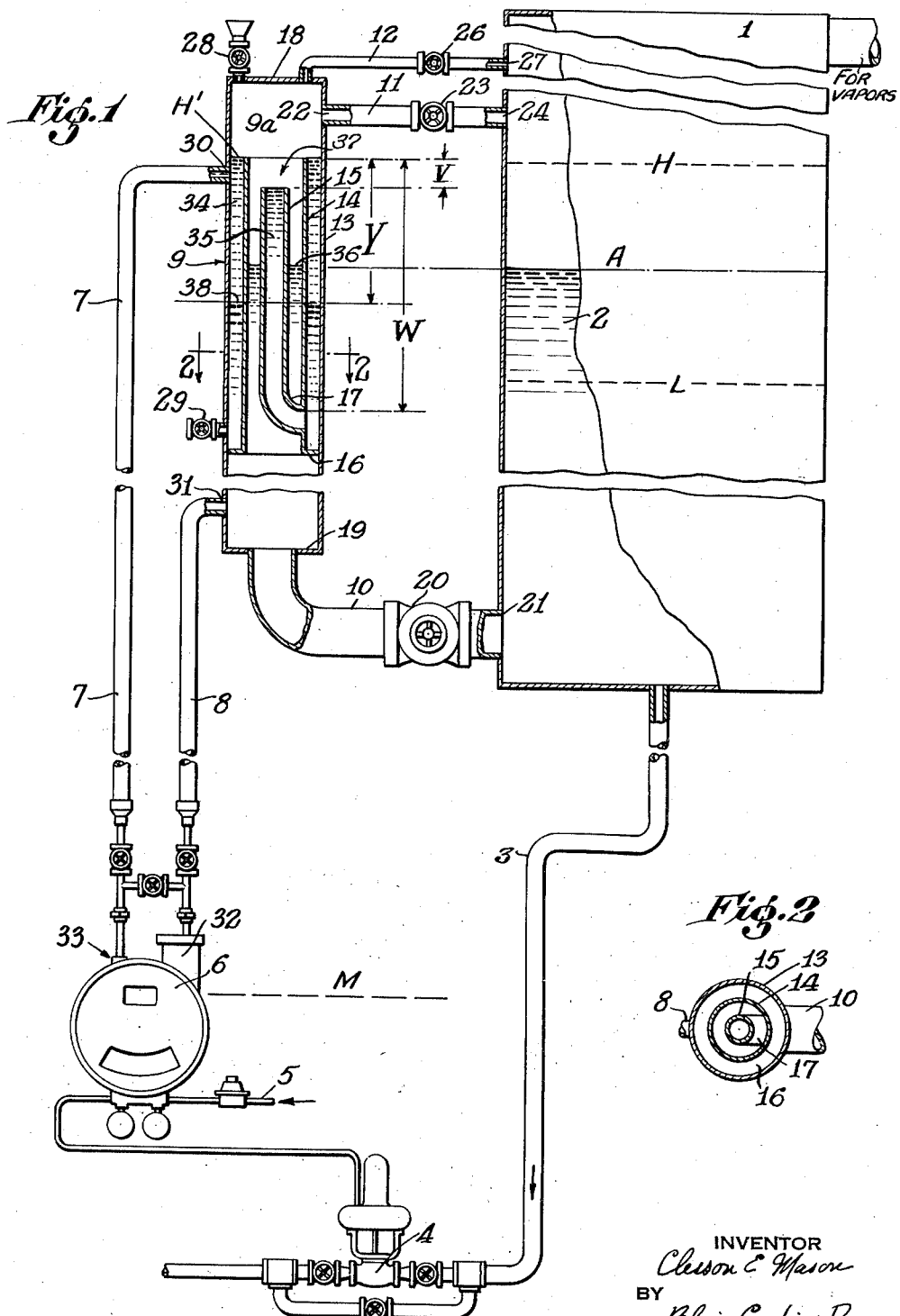

2,179,219

UNITED STATES PATENT OFFICE 2,179,219

FLUID-MEASURING APPARATUS

Clesson E. Mason, Foxboro, Mass., assignor to The Foxboro Company, Foxboro, Mass., a corporation of Massachusetts Application October 14, 1936, Serial No. 105,498

18 Claims. (Cl. 73—299)

This invention relates to the measurement of fluid pressure existing above a liquid and more particularly to problems involved in such measurement of transmitting pressures to a measuring instrument.

A practical example of the use of such measurements occurs in the measuring of liquid level by the differential pressure method in which measurement of the difference between pressure above the liquid and that at some point beneath the surface of the liquid serves as a direct indication of the level of the liquid with respect to some reference level. In the simple case of a reservoir open to the atmosphere, a manometer communicating, by means of a suitable connection, with the hydrostatic pressure at some reference level below the surface of the liquid may be adequate as a level measuring arrangement. If, however, the reservoir is under variable pressure, the manometer usually communicates by means of a second connection with the pressure above the liquid, whereby the effect of the surface pressure on the manometer is cancelled. However, if there is a possibility of liquid entering or condensing in the second connection, it is customary to fill it with a liquid, usually the condensate, and to maintain the upper liquid level in this connection substantially constant at some point usually corresponding to the high level of the liquid variation in the reservoir, and to use this as a reference level. This may be accomplished by inserting a condensing chamber in this second connection to keep the connection full of condensate, excess being returned to the reservoir through an overflow connection.

This arrangement is used when the condensate is of uniform density, equal to that of the liquid in the manometer connection. When, however, the condensate of the vapor entering the condensing chamber contains several liquids of different densities and capable of relatively rapid separation, as, for instance, mixtures of liquid hydrocarbons and water, the problem is more complicated. Mixtures of this type are encountered in petroleum processing plants where petroleum fractions may carry water vapor. In such cases the connections with the manometer are customarily filled with suitable hydrocarbon condensate, both because it constitutes the major portion of the condensing vapor, and because it eliminates the possibility of freezing. When the customary condensing chamber is used in such installations, the condensed water vapor, because of its greater density, may gradually displace the condensate in the instrument connections, thus causing erroneous measurements by increasing the effective differential on the manometer without any corresponding change in the liquid level.

In the present invention these difficulties are overcome by providing a condensing chamber which automatically separates the liquids of different specific gravities condensing therein, and maintains a body of the liquid used as the transmission medium in the manometer connection at a constant level whereby a constant reference level is provided for accurate measurement.

Accordingly, it is an object of this invention to provide a condensing chamber which will automatically separate condensates of different densities and maintain bodies of these individual condensates at constant predetermined levels.

This, and other apparent objects and advantages are obtained by the means described in the following specification, and may be more readily understood by reference to the accompanying drawing, in which:

Figure 1 illustrates a liquid level control system equipped with a condensing chamber embodying features of this invention; and Figure 2 shows a cross-section of the condensing chamber 9 of Figure 1 taken on the line 2—2.

Referring to Figure 1, a closed container 1 is supplied with liquid 2 through a pipe not shown. The flow from the container through pipe 3 is controlled by a fluid pressure operated control valve 4 in order to regulate the level of the liquid 2 in container 1. The fluid pressure applied to valve 4 from supply 5 is controlled by a differential-pressure control instrument, generally indicated at 6, which, in the embodiment herein described, is of the fluid-pressure operated mercury-float manometer type such as the differential pressure sensitive instrument shown in Patent No. 1,686,263 to E. H. Bristol combined with control mechanism such as shown in the Reissue Patent No. 20,092 to C. E. Mason. This instrument 6 meaures the level of liquid 2 in tank 1 by the differential pressure method and controls valve 4 in response to variations of this level. The hydrostatic pressure at some point beneath the liquid in container 1 is transmitted through a pipe 10, the bottom part of a separator generally indicated at 9 and a pipe 8 to the low-pressure chamber 32 of instrument 6; while the pressure existing above the surface of the liquid in container 1 is transmitted through the pipes 11 and 12, a condensing chamber 9a above the separator and a pipe 7 to the high-pressure side 33 of instrument 6; whereby instrument 6 is affected by a differential pressure which bears a direct relation to the level of the liquid 2 in container 1.

The separator 9 is composed of three concentric tubes 13, 14 and 15. These tubes are of different critical minimum lengths dependent upon the particular installation, the range of instrument 6 and the specific gravity of the various condensates, as will be hereinafter described. The intermediate concentric tube 14 is joined at its lower end to the outer tube 13 by an annular plate 16; and the inner tube 15, the top of which is below the top of tube 14, is connected to tube 14 by a right-angle bend 17 whereby it communicates with the annular space between tubes 13 and 14. Thus, these three tubes form an effective U-tube manometer, generally indicated as 37, with the space between tubes 13 and 14 acting as the long leg 34 thereof and with tube 15 functioning as the short leg 35. Outer tube 13 is closed at its top and bottom ends by plates 18 and 19, respectively.

Pipe 7 from the high pressure side 33 of instrument 6 is connected to separator 9 at a point 30 just below the upper end of the long leg 34 of manometer 37, i. e. below the top of tube 14 but above the tube 15; and pipe 8 from the low-pressure side 32 of instrument 6 is connected to separator 9 at a point 31 located beneath annular plate 16.

Pipe 10 is connected from bottom plate 19 to tank 1 at a point 21 located beneath the lower limit of level measurement L. Level L is determined by the range of instrument 6. In all cases the point 31 must be below the lower limit L if the full range of the instrument is to be used. Pipe 11 connects condensing chamber 9a at a point 22 located above the upper end of tube 14 to tank 1 at a point 24 located above the level H which is the upper limit of level measurement. Level H is determined by the elevation of the top of tube 14. Pipe 12 connecting the top 18 of chamber 9a to tank 1 at a point 27 in the container 1 above point 24 aids in the operation of the condenser by conducting non-condensible vapors from the condenser. To this end it is customary to connect the pipe 12 in the container 1 at a point of lower pressure in the container than the pressure at point 24.

Valves 20, 23 and 26 are provided in pipes 10, 11 and 12 respectively, to permit the level measuring apparatus to be shut off from container 1 if desired. A valve 28 is mounted on top plate 18 to provide means for venting condensing chamber 9 and for introducing condensates and water seals into the annular space between tubes 13 and 14 when putting the separator in operation. A valve 29, located at the lower end of the long leg 34 of U-tube manometer 37, is provided for draining the manometer 37.

In the present description of the operation of this device it will be assumed that the two separable condensates of different specific gravities are liquid hydrocarbons and water. The apparatus may be put into condition for operation by first filling the U-tube manometer 37 through valve 28 with hydrocarbons similar in specification to the probable condensate in chamber 9a. During this operation valves 20, 23 and 26 are closed. The connection pipes 7 and 8 are likewise preferably filled with the same hydrocarbons from suitable connections provided at the instrument 6. The lower portion of separator 9, including a small portion of the annular space 36, is also filled with the hydrocarbons. Sufficient water is then poured into manometer 37 (also through valve 28) to form a water seal in the bottom of the manometer. This operation will cause some of the hydrocarbons in the manometer to flow over the top of tube 15 and into the annular space 36. In adding the water, care must be taken not to permit it to flow into pipe 7.

Valve 28 is then closed, and valves 20, 23 and 26 are opened. The apparatus is now in condition for operation, assuming, of course, that instrument 6 has been properly adjusted to measure the difference in pressure existing between chambers 32 and 33.

When liquid 2 in container 1 is at some level A, it assumes this same level in separator 9 in the annular space between tubes 14 and 15. The vapor pressure above the surface of the liquid in condensing chamber 9a is the same as that in the top of container 1, providing pipe 11 is of adequate size. Under these conditions, high-pressure chamber 33 of instrument 6 is affected by a pressure equal to the vapor pressure in the top of the condensing chamber, i. e. on the surface of the liquid, plus the hydrostatic pressure exerted by a column of condensate of height H'M, when M is a plane at the mean level of instrument 6 and when H' is a level in the plane of the top of long leg 34 of the manometer, i. e. the top of tube 14. Likewise the hydrostatic pressure at any point beneath the level in the separator is the same as that at an equivalent point beneath the surface of the liquid in the container 1, and this pressure is communicated through the liquid in pipe 8 to low-pressure chamber 32 of instrument 6 so that chamber 32 is affected by a pressure equal to the pressure on the surface of the liquid plus a hydrostatic pressure equal to that exerted by a column of the hydrocarbons of height AM. Thus, it is apparent that instrument 6 is affected by a differential pressure equal to the hydrostatic pressure of a column of the liquid hydrocarbons of height H'A. As long as level H' remains constant, the pressure on high-pressure side 33 of instrument 6 remains constant, and, as the pressure on low-pressure side 32 varies with the level of the liquid in container 1, the differential pressure affecting instrument 6 varies proportionally to the level of liquid 2 in container 1 with respect to reference level H'.

Water is prevented from displacing the liquid hydrocarbon in pipe 7, and so changing the hydrostatic pressure exerted on instrument 6 by the fluid in this leg, by the operation of the separator 9.

The vapors enter chamber 9a from tank 1 through pipe 11 and condense therein and run into the manometer 37. The long leg 34 of manometer 37 being connected with the sides of the condensing chamber receives a major portion of the condensate mixture. Inasmuch as the heavier portion of the condensate, i. e., the water, sinks while the lighter portion, i. e., hydrocarbons, remains on top, there is a continuous flow of excess hydrocarbons over the upper edge of tube 14 into the annular space 36 between tubes 14 and 15 whence this excess is returned through pipe 10 to container 1. Likewise there is a continuous flow of excess water over the upper edge of tube 15 into the annular space 36. If, in the filling operation previously described, tube 15 was not completely filled with water, then during the period when the separator 9 is first put into operation, water entering the tube 15 from the long leg 34 gradually fills tube 15 causing any hydrocarbons therein to flow over the upper edge of tube 15 and into the annular space 36 until tube 15 is completely filled with water as it is during normal operation.

Due to the immiscibility and difference in densities of liquid hydrocarbons and water, they separate in manometer 37 at some interface 38. With the tube 15 full of water only, the location of this interface 38 is determined mainly by the specific gravities of the two condensates, and the difference in height between the tops of the tubes 14 and 15; and when in normal operation it will assume a definite position when these factors are fixed. The distance Y of this interface 38 beneath the top of long leg 34 of manometer 37 may be determined by means of the following equation:

$$Y = \frac{V}{1 - \frac{S_1}{S_2}}$$

in which V represents the difference in height between the tops of tubes 14 and 15, $S_1$ represents the specific gravity of the lighter condensate and $S_2$ represents the specific gravity of the heavier condensate. Also, it is evident that W, the distance from the top of long leg 34 to the bottom of manometer 37, must always be greater than the distance Y. From these relations it is readily apparent that for a given value of V, as the value of $S_1$ approaches the value of $S_2$ the distance Y, and therefore W, must increase.

In order more clearly to illustrate this relationship, numerical values may be substituted. Assuming that the heavier condensate be water, thus making $S_2$ equal 1, allowing for a 20% safety factor whereby Y equals .8W, and giving a value of 1.6" to V the equation becomes $$W = \frac{1.6}{.8} \times \frac{1}{(1 - S_1)} = \frac{2}{(1 - S_1)}$$

By substituting in this equation various values for $S_1$ up to .9 the solution indicates the W would not have to be greater than 20", and therefore that a manometer leg with W equal to 20" could be used for all specific gravities under .9. For all values above .9, however, W increases rapidly so that, for example, .98 specific gravity would require W equal to 100" and .99 specific gravity would make W equal to 200".

As many embodiments may be made of the above invention, and as many changes might be made in the embodiment above described, it is to be understood that all matter hereinbefore set forth or shown in the accompanying drawing is to be interpreted as illustrative only and not in a limiting sense.

I claim:

1. Apparatus for measuring the level of a liquid in a reservoir having above the liquid a mixture of vapors having separable condensates of different densities, comprising, in combination, a pressure differential meter, a first connection between one side of said meter and said reservoir above the maximum liquid level therein, said first connection containing one of said condensates and being adapted to transmit the pressure of said vapors to the meter, a second connection between the other side of said meter and the reservoir below the minimum liquid level therein adapted to transmit the combined hydrostatic and vapor pressure to the meter, condensing apparatus interposed in said first connection between the meter and reservoir for condensing some of the vapors entering it and at least partially separating the resulting condensates, and means in said condensing apparatus for automatically supplying said first connection with the said one condensate contained therein to the exclusion of another.

2. Apparatus for measuring the level of a liquid in a reservoir having above the liquid a mixture of vapors having separable condensates of different densities, comprising, in combination, a pressure differential meter, a first connection between one side of said meter and said reservoir above the maximum liquid level therein, said first connection containing one of said condensates and being adapted to transmit the pressure of said vapors to the meter, a second connection between the other side of said meter and the reservoir below the minimum liquid level therein adapted to transmit the combined hydrostatic and vapor pressure to the meter, condensing apparatus interposed in said first connection between the meter and reservoir for condensing some of the vapors entering it and at least partially separating the resulting condensates, means in said condensing apparatus for automatically supplying said first connection with the said one condensate contained therein to the exclusion of another, and means for maintaining a substantially constant level of said one condensate in said first connection.

3. Apparatus for use in pressure responsive apparatus affected by the total pressure of vapors having separable condensates of different densities in a container, comprising, in combination, a measuring instrument, a connection between said measuring instrument and said container, said connection containing one of said condensates, a condensing chamber interposed in said connection between said instrument and said container adapted to condense some of the vapors reaching said chamber, means to provide for a continuous flow of vapors thereto, means associated with said condensing chamber for at least partially separating the condensates of said vapors, and means for automatically supplying said connection with the said one of said condensates to the exclusion of another.

4. Apparatus for use in pressure responsive apparatus affected by the total pressure of vapors having separable condensates of different densities in a container, comprising, in combination, a measuring instrument, a connection between said measuring instrument and said container, said connection containing one of said condensates, a condensing chamber interposed in said connection between said instrument and said container adapted to condense some of the vapors reaching said chamber, means to provide for a continuous flow of vapors thereto, means associated with said condensing chamber for at least partially separating the condensates of said vapors, means for automatically supplying said connection with the said one of said condensates to the exclusion of another, and means for maintaining a substantially constant level of said one condensate in said connection.

5. Apparatus for use in pressure responsive apparatus affected by the total pressure of vapors having separable condensates of different densities in a container, comprising, in combination, a measuring instrument, a connection between said measuring instrument and said container, said connection containing one of said condensates, a condensing chamber interposed in said connection between said instrument and said container adapted to condense some of the vapors reaching said chamber, means to provide for a continuous flow of vapors thereto, means associated with said condensing chamber for maintaining a column of said condensates, said column comprising a body of the lighter of said condensates above a body of the heavier of said condensates, and said instrument communicating with the body of one of said condensates by said connection whereby said connection is automatically supplied with said one condensate to the exclusion of the other.

6. Apparatus for use in pressure responsive apparatus affected by the total pressure of vapors having separable condensates of different densities in a container, comprising, in combination, a measuring instrument, a connection between said measuring instrument and said container, said connection containing one of said condensates, a condensing chamber interposed in said connection between said instrument and said container adapted to condense some of the vapors reaching said chamber, means to provide for a continuous flow of vapors thereto, means associated with said condensing chamber for maintaining a column of said condensates, said column comprising a body of the lighter of said condensates above a body of the heavier of said condensates, said instrument communicating with the body of one of said condensates by said connection whereby said connection is automatically supplied with said one condensate to the exclusion of the other, and means for maintaining the interface between said condensates at a substantially constant level whereby the effective level of said one condensate in said connection is maintained substantially constant.

7. Apparatus for use in pressure responsive apparatus affected by the total pressure of vapors having separable condensates of different densities in a container, comprising, in combination, a measuring instrument, a connection between said measuring instrument and said container, said connection containing one of said condensates, a condensing chamber interposed in said connection between said instrument and said container adapted to condense some of the vapors reaching said chamber, means to provide for a continuous flow of vapors thereto, means associated with said condensing chamber for maintaining a column of said condensates, said column comprising a body of the lighter of said condensates above a body of the heavier of said condensates, said instrument communicating with the body of one of said condensates by said connection whereby said connection is automatically supplied with said one condensate to the exclusion of the other, and overflow connections associated with the body of each of said condensates whereby the effective level of said one condensate in said connection is maintained substantially constant.

8. Apparatus for use in pressure responsive apparatus affected by the total pressure of vapors having separable condensates of different densities in a container, comprising, in combination, a measuring instrument, a connection between said measuring instrument and said container, said connection containing one of said condensates, a condensing chamber interposed in said connection between said instrument and said container adapted to condense some of the vapors reaching said chamber, means to provide for a continuous flow of vapors thereto, means associated with said condensing chamber forming an effective U-tube manometer having a long leg and a short leg, condensing means associated with the top of each of said legs, the entire short leg and a portion of said long leg being filled with the heavier of said condensates, the remainder of said long leg being filled with the lighter of said condensates whereby said condensates condensed by said condensing means are automatically separted in said U-tube, and said instrument connection communicating with said U-tube manometer on the side of the interface between said condensates occupied by the said one condensate contained in said connection whereby said connection is automatically supplied with the said one condensate to the exclusion of the other.

9. Apparatus for use in pressure responsive apparatus affected by the total pressure of vapors having separable condensates of different densities in a container, comprising, in combination, a measuring instrument, a connection between said measuring instrument and said container, said connection containing one of said condensates, a condensing chamber interposed in said connection between said instrument and said container adapted to condense some of the vapors reaching said chamber, means to provide for a continuous flow of vapors thereto, means associated with said condensing chamber forming an effective U-tube manometer having a long leg and a short leg, a condensing surface associated with the top of said long leg, a smaller condensing surface associated with the top of said short leg, the entire short leg and a portion of said long leg being filled with the heavier of said condensates, the remainder of said long leg being filled with the lighter of said condensates, whereby said condensates condensing on said condensing surfaces are automatically separated in said U-tube, and said instrument connection communicating with said U-tube manometer on the side of the interface between said condensates occupied by the said one condensate contained in said connection whereby said connection is automatically supplied with the said one condensate to the exclusion of the other.

10. Apparatus for use in pressure responsive apparatus affected by the total pressure of vapors having separable condensates of different densities in a container, including, in combination, a measuring instrument, a connection between said measuring instrument and said container, said connection containing one of said condensates, a condensing chamber interposed in said connection for condensing some of the vapors reaching said chamber, means associated with said condensing chamber for at least partially separating the condensates of said vapors, and means for automatically supplying said connection with the said one of said condensates to the exclusion of another.

11. Apparatus for measuring the level of a liquid in a container having above the liquid a mixture of vapors having separable immiscible condensates of different densities, comprising, in combination, a pressure differential meter, a first connection between one side of said meter and said container above the maximum liquid level therein for transmitting the pressure of said vapors to the meter, a second connection between the other side of said meter and the container below the minimum liquid level therein, said second connection containing the condensate of one of said constituents and being adapted to transmit the combined hydrostatic and vapor pressure to the meter, and means interposed in said second connection for automatically supplying said second connection with said one condensate contained therein to the exclusion of another.

12. Apparatus for measuring the level of a liquid in a container having above the liquid a mixture of vapors having separable immiscible condensates of different densities, comprising, in combination, condensing apparatus, means for continuously circulating some of said vapors through the upper portion of said condensing apparatus, means for continuously condensing some of said circulated vapors to maintain a continuous flow of condensates from said condensing apparatus to said container below the minimum liquid level therein, a differential pressure meter, a first connection between one side of said meter and the upper portion of said condensing apparatus for transmitting the pressure of said vapors to the meter, a second connection between the other side of said meter and said condensing apparatus containing the condensate of the lighter of said condensates for transmitting the combined hydrostatic pressure of and vapor pressure on the liquid to the meter, the place at which said second connection joins to said condensing apparatus being below the minimum liquid level of the liquid in the container but above the place in the container at which said condensates flow into said container, whereby the heavier of said condensates is prevented from entering said second connection.

13. In pressure responsive apparatus affected by the total pressure of vapors in a reservoir having separable constituents of different densities, condensing apparatus for condensing some of said vapors and at least partially separating the resulting condensates, comprising, in combination, a first vertical tube closed at both ends to form a container, a second tube shorter than said first tube concentrically mounted in and intermediate the ends of said first tube and attached to said first tube above the lower end thereof to form an annular cylindrical space therebetween sealed off from the lower portion of said container, a third tube concentrically mounted within said second tube with its upper end below the upper end of said second tube and its lower end communicating with said annular space and so connected with said second tube as to permit liquid overflowing the tops of said second and third tubes to descend into the lower portion of said container, a connection from the upper portion of said container above the top of said second tube to said reservoir, a connection from the lower portion of said container to permit the removal of liquid therefrom, and a connection from said annular space immediately beneath the top of said second tube to a measuring instrument.

14. In apparatus for measuring the level of a liquid in a reservoir having above the liquid a mixture of vapors having separable condensates of different densities, condensing apparatus for continuously condensing some of said vapors and at least partially separating the resulting condensates, comprising, in combination, a first vertical tube closed at both ends to form a container, a second tube shorter than said first tube concentrically mounted in and intermediate the ends of said first tube and attached to said first tube above the lower end thereof to form an annular cylindrical space therebetween sealed off from the lower portion of said container, a third tube concentrically mounted within said second tube with its upper end below the upper end of said second tube and its lower end communicating with said annular space and so connected with said second tube as to permit liquid overflowing the tops of said second and third tubes to descend into the lower portion of said container, a first connection from the upper portion of said container above the top of said second tube to said reservoir above the maximum liquid level therein, a second connection from the lower portion of said container to said reservoir below the minimum liquid level therein, a third connection from said annular space immediately beneath the top of said second tube to one side of a differential pressure meter, and a fourth connection from the lower portion of said container above said second connection to the other side of said meter.

15. Apparatus for use in pressure responsive apparatus affected by the pressure of vapors in a container having separable condensates of different densities, comprising, in combination, means for condensing some of said vapors, means for separating at least some of the condensates thus obtained into at least two portions according to the densities thereof, means for maintaining a body of one of said condensate portions, and means responsive to the combined hydrostatic pressure of and the vapor pressure on said body of said one condensate portion.

16. Apparatus for use in pressure responsive apparatus affected by the pressure of vapors in a container having separable condensates of different densities, comprising, in combination, means for continuously condensing some of said vapors, means for separating at least some of the condensates thus obtained into at least two portions according to the densities thereof, means for maintaining a body of one of said condensate portions at a predetermined level, and means responsive to the combined hydrostatic pressure of and the vapor pressure on said body of said one condensate portion.

17. Apparatus for measuring the level of a liquid in a container having above the liquid a mixture of vapors having separable condensates of different densities, comprising, in combination, means for continuously condensing some of said vapors, means for separating at least some of the condensates thus obtained into at least two portions according to the densities thereof, means for maintaining a body of one of said condensate portions at a predetermined level, and means for measuring the differential pressure between the combined hydrostatic pressure of and the vapor pressure on said body of said one condensate portion, and the combined hydrostatic pressure of and vapor pressure on the liquid in the container.

18. Apparatus for use in pressure responsive apparatus affected by the pressure of a mixture of the vapors of separable condensates of different densities, in combination, a chamber through which the condensates of said mixture flow, pressure responsive means, a connection filled with the lighter of said condensates for connecting said pressure responsive means to said chamber, a generally horizontal plate attached to a generally vertical wall and forming a separate portion of said chamber, an outlet in the bottom of said portion, said horizontal plate having an aperture directly above said outlet through which the condensates of said mixture flow downwardly to fill said separate portion and leave through said outlet, said connection being connected with said chamber at a point in said vertical wall beneath said horizontal plate and out of the line of the gravity flow of the condensates of said mixture through said aperture to said opening whereby the heavier of said condensates are prevented from entering said connection.

CLESSON E. MASON.